(12) United States Patent
Hashimoto (10) Patent No.: US 6,947,562 B2
(45) Date of Patent: Sep. 20, 2005

(54) ELECTRONIC WATERMARK DETECTING/INSERTING DEVICE

(75) Inventor: Masahiro Hashimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 788 days.

(21) Appl. No.: 09/767,483

(22) Filed: Jan. 23, 2001

(65) Prior Publication Data

US 2001/0009581 A1 Jul. 26, 2001

(30) Foreign Application Priority Data

Jan. 24, 2000 (JP) ........................................ 2000-013835

(51) Int. Cl.[7] .............................................. H04N 7/167
(52) U.S. Cl. ...................................... 380/205; 382/100
(58) Field of Search ................................ 380/28, 4, 30, 380/54, 205; 382/100, 205, 232; 713/168–181

(56) References Cited

U.S. PATENT DOCUMENTS 6,282,654 B1 * 8/2001 Ikeda et al. .................. 713/200
6,332,194 B1 * 12/2001 Bloom et al. ................ 713/176

FOREIGN PATENT DOCUMENTS

| EP | 0 955 767 A2 | 11/1999 |
|---|---|---|
| EP | 0 967 803 A2 | 12/1999 |
| EP | 1 006 710 A2 | 6/2000 |
| JP | 11-55638 | 2/1999 |
| JP | 11-69137 | 3/1999 |
| JP | 11-98341 | 4/1999 |
| JP | 11-98479 | 4/1999 |
| JP | 11-212463 | 8/1999 |
| JP | 11-346302 | 12/1999 |

OTHER PUBLICATIONS

S. Sakazawa, et al. "A Note on Watermarking Method for Moving Picture to Extract from MPEG Bitstream", SCIS'99 The 1999 Symposium on Cryptography and Information Security Kobe, Japan, Jan. 26–29, 1999. The Institute of Electronics, Information and Communication Engineers pp. 307 to 312.

* cited by examiner

Primary Examiner—Kim Vu
Assistant Examiner—Paula Klimach
(74) Attorney, Agent, or Firm—Scully, Scott, Murphy & Presser (57) ABSTRACT

In an electronic watermark detecting/inserting device which includes an electronic watermark detecting section (30) for detecting a first electronic watermark from a first DCT coefficient of an input digital image to produce a request for insertion of a second electronic watermark and an electronic watermark inserting section (20) for producing, in response to the request for insertion of the second electronic watermark, an output digital image which includes the first electronic watermark inserted therein and the second electronic watermark inserted subsequently to the first electronic watermark in the output digital image and which has the second DCT coefficient, a second DCT coefficient producing section (40) produces the second DCT coefficient from the output digital image. A DCT coefficient supplying section (50) supplies the second DCT coefficient from the second DCT coefficient producing section to the electronic watermark detecting section. The electronic watermark detecting section detectes, when supplied with the second DCT coefficient from the DCT coefficient supplying section, the second electronic watermark from the second DCT coefficient and produces a detection result representative of a detection intensity of the second electronic watermark to deliver the detection result to the electronic watermark inserting section. The electronic watermark inserting section adjusts, in response to the detection intensity represented by the detection result, an insertion intensity of the second electronic watermark to be inserted into the input digital image.

8 Claims, 4 Drawing Sheets

ELECTRONIC WATERMARK DETECTING/ INSERTING DEVICE

BACKGROUND OF THE INVENTION

This invention relates to a method and an apparatus for detecting and inserting an electronic watermark in a digital image according to a MPEG (Moving Picture Experts Group) standard and, in particular, to a method of adjusting the insertion intensity of an electronic watermark.

Japanese Unexamined Patent Publication No. H11-55638 discloses an information adding (or superimposing) device for adding information to an image by selecting at least a partial area within the image as an information adding area and enlarging or reducing the image in the information adding area. Thus, the above-mentioned Japanese Unexamined Patent Publication No. H11-55638 describes an electronic watermark insertion algorithm for inserting an electronic watermark by enlarging or reducing the image. However, the above-mentioned Japanese Unexamined Patent Publication No. H11-55638 does not describe the adjustment of the insertion intensity of the electronic watermark.

Japanese Unexamined Patent Publication No. H11-98341 discloses another electronic watermark insertion algorithm for inserting an electronic watermark into a quantized DCT (Discrete Cosine Transform) coefficient at random. However, the above-mentioned Japanese Unexamined Patent Publication No. H11-98341 does not describe the adjustment of the insertion intensity of the electronic watermark.

Japanese Unexamined Patent Publication No. H11-212463 discloses another electronic watermark insertion algorithm for inserting an electronic watermark after one-dimensional data such as a speech sound is subjected to modified discrete cosine transform (modified DCT). However, the abovementioned Japanese Unexamined Patent Publication No. H11-212463 does not describe the adjustment of the insertion intensity of the electronic watermark.

Thus, all of the three publications mentioned above relate to the electronic watermark insertion algorithm itself while this invention relates to the adjustment of the insertion intensity of the electronic watermark.

In recent years, a digital image is easily sent to a user by the spread of digital satellite broadcasting, internetworking distribution, a DVD (Digital Video or Versatile Disc), and so on. The digital image is not deteriorated in quality even if it is duplicated or reproduced. Therefore, copyright protection of the digital image is an important problem. In order to realize the copyright protection, proposal is made of a technique of adding copyright information as an electronic watermark in a DCT (Discrete Cosine Transform) coefficient region of the digital image.

Figure 1:
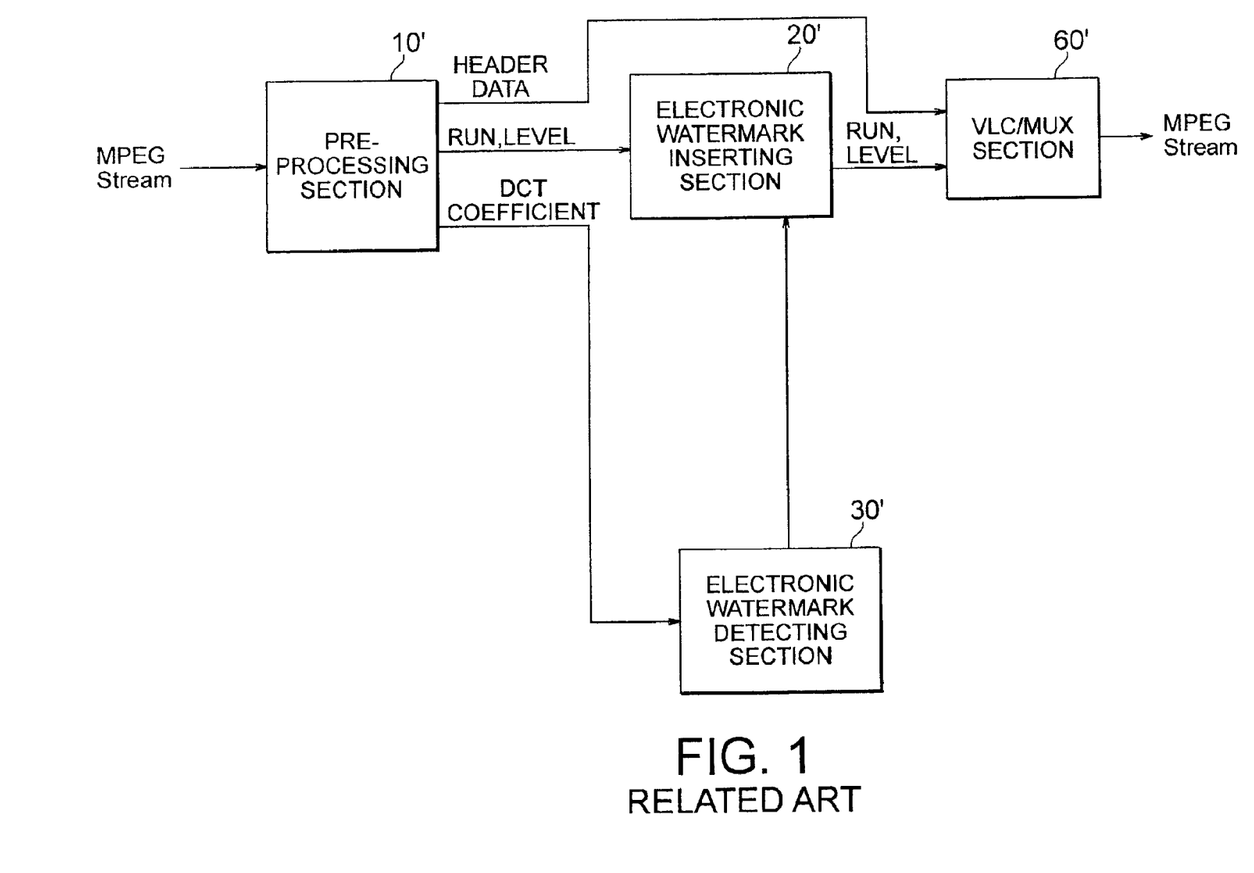
FIG. 1 is a block diagram of a related electronic watermark detecting/inserting device.

Referring to FIG. 1, a related electronic watermark detecting/inserting device serves as an information inserting device in a DCT coefficient. The electronic watermark is a technique intended for the copyright protection and has a function of managing generation information. When an input digital image comprising a first electronic watermark inserted therein is supplied as an MPEG stream, the electronic watermark detecting/inserting device produces an output digital image containing a second electronic watermark inserted therein subsequently to the first electronic watermark. Specifically, if the second electronic watermark is not detected from the input digital image after the first electronic watermark is detected from the input digital image, the electronic watermark detecting/inserting device produces the output digital image containing the second electronic watermark inserted therein subsequently to the first electronic watermark.

The electronic watermark detecting/inserting device comprises a preprocessing section 10' for receiving, as a digital image to be subjected to electronic watermark insertion, image data (MPEG stream) encoded by the MPEG standard. The preprocessing section 10' carries out an operation similar to ordinary MPEG decoding upon the MPEG stream as the image data. The ordinary MPEG decoding comprises four major operations including header search, VLD (Variable Length Decoding), quantization, and IDCT (Inverse Discrete Cosine Transform). On the other hand, the preprocessing section 10' of the electronic watermark detecting/inserting device illustrated in FIG. 1 does not carry out the IDCT. The preprocessing section 10' produces data (header data) other than a block layer, a run and a level (which will later be described) produced by the VLD of the data of the block layer, and a DCT coefficient. The DCT coefficient is obtained by multiplying the level and a quantization coefficient. The quantization coefficient is obtained by multiplying a quantization scale and a quantization table.

In FIG. 1, an electronic watermark detecting section 30' can detect both of the first and the second electronic watermarks and, if the second electronic watermark is not detected after the first electronic watermark is detected, sends a request for insertion of the second electronic watermark to an electronic watermark inserting section 20'. Supplied from the electronic watermark detecting section 30' with the request for insertion of the second electronic watermark, the electronic watermark inserting section 20' inserts the second electronic watermark.

Description will be made in detail about the operation of the electronic watermark detecting/inserting device illustrated in FIG. 1.

The electronic watermark detecting section 30' is supplied from the preprocessing section 10' with the DCT coefficient and carries out a detecting operation for the first electronic watermark. If the first electronic watermark is detected as a result of detection, another detecting operation for the second electronic watermark is carried out. If the second electronic watermark is not detected, the electronic watermark detecting section 30' judges that the second electronic watermark must be inserted into the image data in consideration, and supplies the electronic watermark inserting section 20' with a request for insertion of the second electronic watermark.

In response to the request, the electronic watermark inserting section 20' inserts the second electronic watermark. At this time, the electronic watermark inserting section 20' is supplied from the preprocessing section 10' with the run and the level and inserts the second electronic watermark into the image data.

A VLC/MUX section 60' carries out VLC (Variable Length Coding) upon the level and the run produced by the electronic watermark inserting section 20' to produce coded data of the block layer in the MPEG stream. The VLC/MUX section 60 carries out MUX (multiplexing) for the coded data and the header data separated by the preprocessing section 10' to reproduce the MPEG stream.

Thus, the electronic watermark detecting section 30' is supplied from the preprocessing section 10' with the DCT coefficient and detects the first electronic watermark and the second electronic watermark following thereto. If the second electronic watermark is not detected after the first electronic watermark is detected, the electronic watermark detecting section 30' supplies the electronic watermark inserting section 20' with the request for insertion of the second electronic watermark. In response to the request, the electronic watermark inserting section 20' is supplied with the run and the level from the preprocessing section 10' and inserts the second electronic watermark into the image data. Once the insertion of the second electronic watermark is started, the electronic watermark inserting section 20' inserts the second electronic watermark of a predetermined intensity unless a request for stopping the insertion is received.

In the electronic watermark inserting method of the above-mentioned structure, the electronic watermark of the predetermined intensity is inserted into either of the image data weak in detection intensity of the second electronic watermark and the image data strong in detection intensity.

SUMMARY OF THE INVENTION

It is an object of this invention to provide an electronic watermark detecting/inserting device capable of automatically adjusting an insertion intensity of an electronic watermark.

According to this invention, there is provided an electronic watermark detecting/inserting device for producing, in response to an input digital image which comprises a first electronic watermark inserted therein and which has a first DCT (Discrete Cosine Transform) coefficient, an output digital image which comprises the first electronic watermark inserted therein and a second electronic watermark inserted subsequently to the first electronic watermark in the output digital image and which has a second DCT coefficient, the device comprising:

a first DCT coefficient producing section for producing the first DCT coefficient from the input digital image;

an electronic watermark detecting section for detecting the first electronic watermark from the first DCT coefficient and for producing a request for insertion of the second electronic watermark;

an electronic watermark inserting section for inserting, in response to the request for insertion of the second electronic watermark, the second electronic watermark into the input digital image subsequently to the first electronic watermark and for producing the output digital image which comprises the second electronic watermark inserted subsequently to the first electronic watermark in the output digital image and which has the second DCT coefficient;

a second DCT coefficient producing section for producing the second DCT coefficient from the output digital image; and a DCT coefficient supplying section for supplying the second DCT coefficient from the second DCT coefficient producing section to the electronic watermark detecting section;

the electronic watermark detecting section detecting, when supplied with the second DCT coefficient from the DCT coefficient supplying section, the second electronic watermark from the second DCT coefficient and producing a detection result representative of a detection intensity of the second electronic watermark to deliver the detection result to the electronic watermark inserting section;

the electronic watermark inserting section adjusting, in response to the detection intensity represented by the detection result, an insertion intensity of the second electronic watermark to be inserted into the input digital image.

According to this invention, there is also provided an electronic watermark detecting/inserting device for producing, in response to an input video signal which comprises a first electronic watermark inserted therein, an output video signal which comprises the first electronic watermark inserted therein and a second electronic watermark inserted subsequently to the first electronic watermark in the output video signal, the device comprising:

an electronic watermark detecting section for detecting the first electronic watermark from the input video signal and for producing a request for insertion of the second electronic watermark;

an electronic watermark inserting section for inserting, in response to the request for insertion of the second electronic watermark, the second electronic watermark into the input video signal subsequently to the first electronic watermark and for producing the output video signal which comprises the second electronic watermark inserted subsequently to the first electronic watermark in the output video signal; and a supplying section for supplying the output video signal to the electronic watermark detecting section;

the electronic watermark detecting section detecting, when supplied with the output video signal from the supplying section, the second electronic watermark from the output video signal and producing a detection result representative of a detection intensity of the second electronic watermark to deliver the detection result to the electronic watermark inserting section;

the electronic watermark inserting section adjusting, in responsive to the detection intensity represented by the detection result, an insertion intensity of the second electronic watermark to be inserted into the input video signal.

DESCRIPTION OF THE PREFERRED EMBODIMENTS

Now, description will be made of embodiments of this invention with reference to the drawing.

Figure 2:
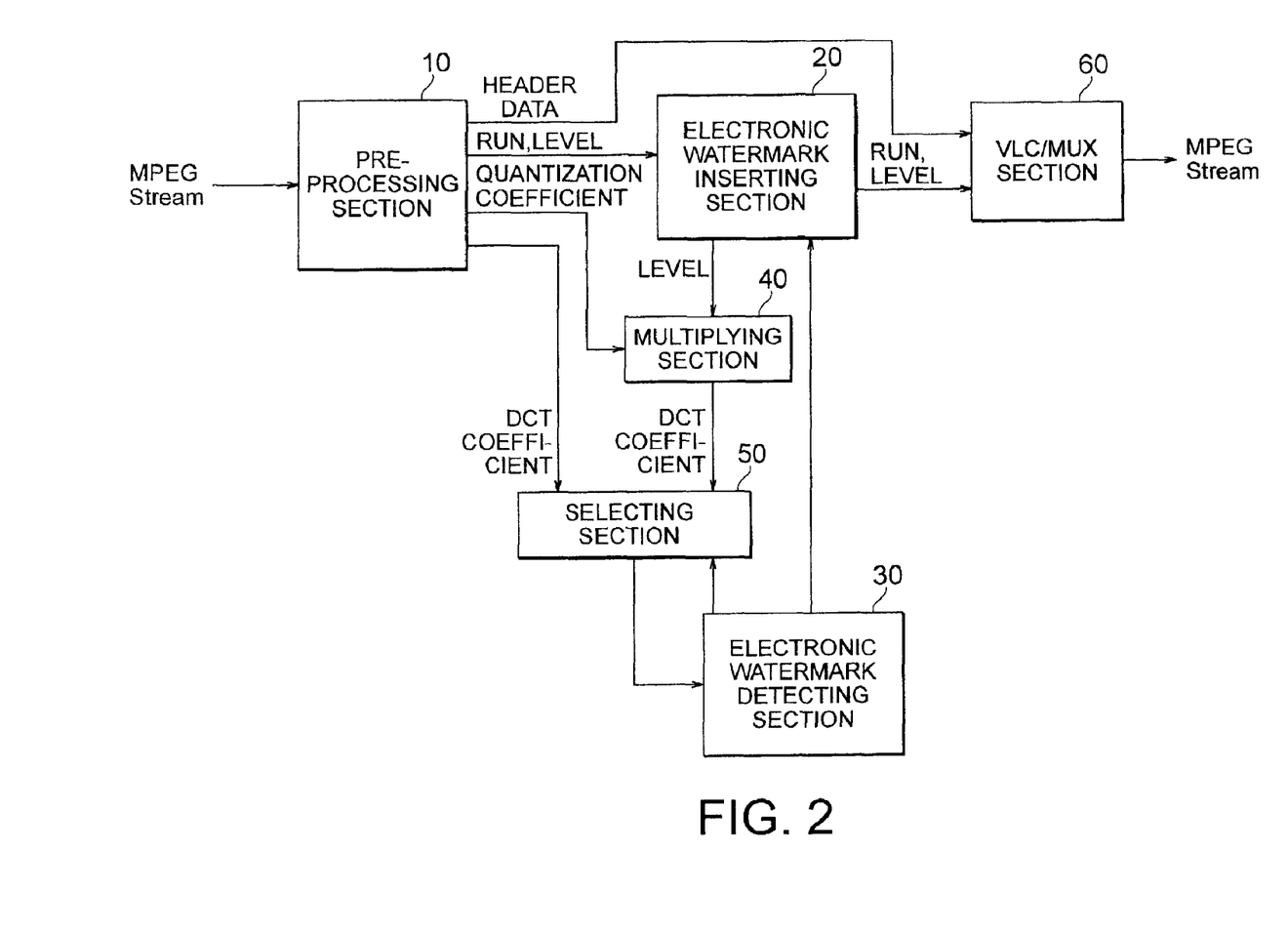
FIG. 2 is a block diagram of an electronic watermark detecting/inserting device according to one embodiment of this invention.

Referring to FIG. 2, an electronic watermark detecting/inserting device is used in case where a digital image as an object of electronic watermark insertion is image data (MPEC stream) encoded according to the MPEG standard. In case where a second electronic watermark is embedded (or inserted) into the image data (MPEG stream) encoded according to the MPEG standard, the electronic watermark detecting/inserting device automatically increases or decreases an embedding (or insertion) intensity to improve a detection result.

In FIG. 2, an electronic watermark inserting section 20 is responsive to a request for insertion of the second electronic watermark from an electronic watermark detecting section 30 and inserts the second electronic watermark. The image data with the second electronic watermark inserted therein is fed back through a multiplying section 40 and a selecting section 50 to the electronic watermark detecting section 30. The detection result obtained by the electronic watermark detecting section 30 is delivered to the electronic watermark inserting section 20. With reference to the detection result, the electronic watermark inserting section 20 adjusts the insertion intensity of the second electronic watermark.

Figure 3:
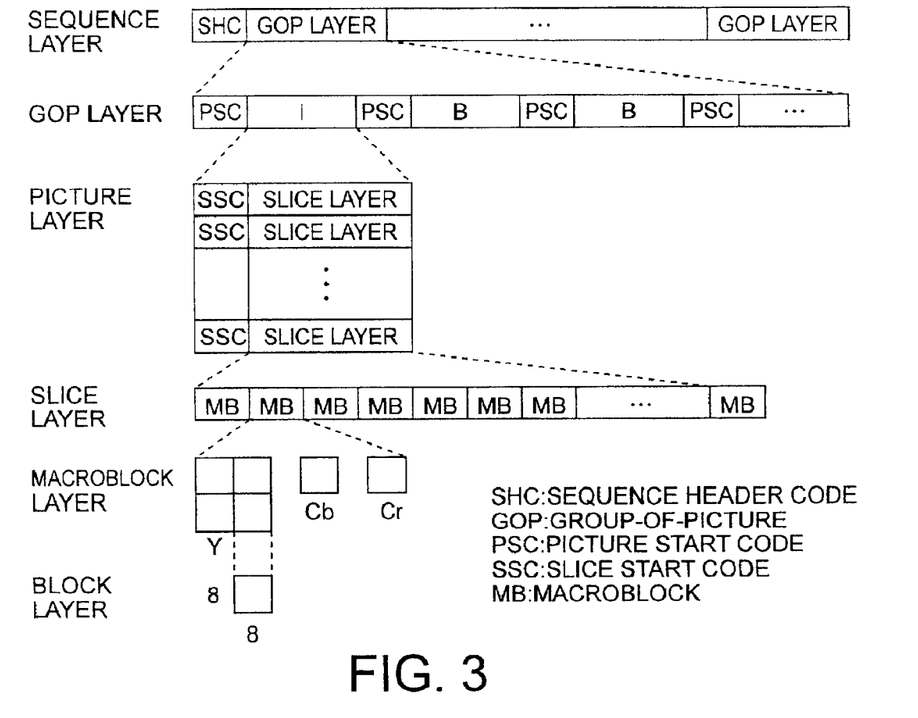
FIG. 3 is a view for describing image data encoded according to the MPEG standard and depicted in FIG. 2 as an MPEG stream.

Referring to FIG. 3, description will be made of the image data encoded according to the MPEG standard and depicted in FIG. 2 as the MPEC stream.

The image data encoded by the encoding method of the MPEG standard has a hierarchical structure illustrated in FIG. 3. In FIG. 3, a sequence layer comprises a sequence header code (SHC) and a group-of-picture (GOP) layer following the sequence header code (SHC). The group-of-picture (GOP) layer comprises a picture start code (PSC) and a picture layer following the picture start code (PSC).

Herein, information of each frame or field of the image is described in the picture layer following the picture start code (PSC) and a subdivided layer in the picture layer. The information of each frame or field is encoded into one of picture formats of three kinds, including an I picture (intra coded picture), a P picture (predictive coded picture), and a B picture (bidirectionally predictive coded picture). For each of the P picture and the B picture, another image temporally separated therefrom is used as a reference image and only a difference from the reference image is encoded as image information. Each picture is divided into a plurality of blocks, subjected to DCT (discrete cosine transform) block by block, quantized by the use of an appropriate quantization coefficient, and encoded into a Huffman code.

The field information of each frame is contained in a macroblock (MB) layer within a slice layer following a slice start code (SSC), and is represented by six block layers in total including four block layers indicating luminance information Y and two block layers indicating color difference information Cb and Cr in case where a color difference format is 4:2:0.

Figure 4:
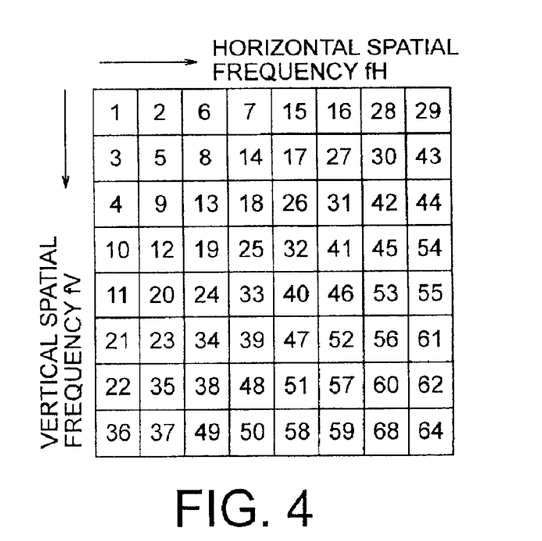
FIG. 4 is a view for describing variable length coding using the Huffman code in the electronic watermark detecting/inserting device illustrated in FIG. 2.

Referring to FIG. 4, description will further be made about the variable length coding using the Huffman code.

In case of zigzag scanning, a quantized DCT coefficient is scanned in a numerical order illustrated in FIG. 4 and converted into a one-dimensional series of 64 elements. The position 1 in the figure represents a direct current (DC) component of a DCT conversion region. Rightward from this position in the horizontal direction, the DCT conversion region has a higher frequency band. Downward from this position in the vertical direction, the DCT conversion region has a higher frequency band. Therefore, scanning is started from the position 1 at an upper left corner and proceeds in a zigzag fashion in the order of 2, 3, . . . , and 64, i.e., obliquely from the low frequency band to the high frequency band in the DCT conversion region. For the one-dimensional series of the 64 elements, an amplitude of each non-zero coefficient (amplitude of a coefficient which is not equal to zero and will hereinafter be called a level) except the DC component (first component of the one-dimensional series) of the DCT coefficient and the length (hereinafter called a run) of a succession of zero coefficients (coefficients equal to zero) preceding thereto are combined. For each combination of the run and the level, the value of a table of quantization coefficients, called a quantization table, is uniquely determined. In the ordinary MPEG decoding, a value (hereinafter called a DCT coefficient) obtained by multiplying the level, the value of the quantization table, and a quantization scale is subjected to inverse discrete cosine transform to produce a resultant value to be converted into a video image. (Hereinafter, a value obtained by multiplying the value of the quantization table and the quantization scale will be called a quantization coefficient.)

In FIG. 2, the electronic watermark detecting/inserting device is supplied as an MPEG stream with an input digital image containing a first electronic watermark inserted therein and produces an output digital image containing a second electronic watermark inserted therein subsequently to the first electronic watermark. Specifically, the electronic watermark detecting/inserting device produces the output digital image containing the second electronic watermark inserted therein subsequently to the first electronic watermark in case where the second electronic watermark is not detected from the input digital image after the first electronic watermark is detected from the input digital image.

In FIG. 2, the electronic watermark detecting section 30 can detect both of the first electronic watermark and the second electronic watermark and, if the second electronic watermark is not detected after the first electronic watermark is detected, delivers to the electronic watermark inserting section 20 a request for insertion of the second electronic watermark. Supplied from the electronic watermark detecting section 30 with the request for insertion of the second electronic watermark, the electronic watermark inserting section 20 inserts the second electronic watermark.

Description will be made of an operation of the electronic watermark detecting/inserting device illustrated in FIG. 2.

Upon the MPEG stream as the image data, a preprocessing section 10 carries out an operation similar to the ordinary MPEG decoding. The ordinary MPEG decoding comprises four major operations including header search, VLD (Variable Length Decoding), quantization, and IDCT (Inverse Discrete Cosine Transform). On the other hand, the preprocessing section 10 of this invention does not carry out the IDCT The preprocessing section 10 delivers, to a succeeding stage, data (header data) other than the block layer, the run and the level obtained by the VLD for the data in the block layer, the quantization coefficient obtained by multiplying the quantization scale and the quantization table, and the DCT coefficient obtained by multiplying the level and the quantization coefficient.

The selecting section 50 at first selectively supplies the DCT coefficient from the preprocessing section 10 to the electronic watermark detecting section 30. The electronic watermark detecting section 30 receives through the selecting section 50 the DCT coefficient from the preprocessing section 10 and carries out the detecting operation for the first electronic watermark. If the detection result gives the first electronic watermark, the detecting operation for the second electronic watermark is successively carried out. If the second electronic watermark is not detected, the electronic watermark detecting section 30 judges that the second electronic watermark must be inserted into the data in consideration and delivers the request for insertion of the second electronic watermark to the electronic watermark inserting section 20.

In response to the request, the electronic watermark inserting section 20 inserts the second electronic watermark. Upon insertion of the second electronic watermark, the electronic watermark inserting section 20 calculates an insertable electronic watermark amount from the run and the level supplied from the preprocessing section 10 and adds the amount to the level.

A VLC/MUX section 60 is supplied with the level and the run converted by the electronic watermark inserting section 20 and carries out the VLC (Variable Length Coding) to encode the level and the run into coded data of the block layer in the MPEG stream. Furthermore, the VLC/MUX section 60 carries out the MUX (multiplexing) for the coded data and the header data separated by the preprocessing section 10 to reproduce the MPEG stream.

As described above, the electronic watermark inserting section 20 is supplied from the electronic watermark detecting section 30 with the information representative of whether or not the second electronic watermark is to be inserted. Supplied from the electronic watermark detecting section 30 with the information representing that the second electronic watermark is to be inserted, the electronic watermark inserting section 20 inserts the second electronic watermark. The data with the electronic watermark inserted therein pass through the multiplying section 40 and the selecting section 5 to be fed back to the electronic watermark detecting section 30. From the detection result, the electronic watermark inserting section 20 adjust the insertion intensity. At this time, the multiplying section 40 produces the DCT coefficient obtained by multiplying the level of the data with the second electronic watermark inserted therein and the quantization coefficient supplied from the preprocessing section 10. The selecting section 50 selectively delivers the DCT coefficient from the multiplying section 40 to the electronic watermark detecting section 30.

As described above, according to this invention, the first electronic watermark is detected by the use of the DCT coefficient from the preprocessing section 10 and, thereafter, the second electronic watermark is inserted by the use of the run and the level from the preprocessing section 10. The multiplying section 40 again calculates the DCT coefficient for the data with the second electronic watermark inserted therein. The electronic watermark detecting section 30 again detects the second electronic watermark inserted therein to judge the intensity of the second electronic watermark. The judgment result is used for adjustment of the insertion intensity. In this manner, the insertion intensity is automatically adjusted.

Next, description will be made further in detail about the electronic watermark detecting/inserting device illustrated in FIG. 2.

In FIG. 2, the preprocessing section 10 is supplied with the MPEG stream as the input image data and carries out MPEG decoding and information holding therefor to demultiplex the data of the MPEG stream into the header data, the run and the level, and the quantization coefficient. The DCT coefficient is produced from the level and the quantization coefficient.

The selecting section 50 at first selectively supplies the DCT coefficient from the preprocessing section 10 to the electronic watermark detecting section 30. If the first electronic watermark is detected from the DCT coefficient supplied from the preprocessing section 10 but the second electronic watermark following the first electronic watermark can not be detected, the electronic watermark detecting section 30 delivers to the electronic watermark inserting section 20 the request for insertion of the second electronic watermark and delivers to the selecting section 50 a request to selectively output the DCT coefficient supplied from the multiplying section 40.

Supplied from the electronic watermark detecting section 30 with the request for insertion, the electronic watermark inserting section 20 is supplied with the run and the level from the preprocessing section 10 and delivers to the VLC/MUX section 60 the run and the level with the second electronic watermark inserted therein. The VLC/MUX section 60 carries out the VLC (Variable Length Coding) upon the run and the level, the MUX (Multiplexing) for the coded data and the header data, and the conversion of the data into the MPEG stream to output the MPEG stream.

The multiplying section 40 multiplies the quantization coefficient supplied from the preprocessing section 10 and the level supplied from the electronic watermark inserting section 20 to produce a multiplication result which is delivered as the DCT coefficient to the selecting section 50.

At this time, the selecting section 50 is supplied from the electronic watermark detecting section 30 with the request to selectively output the DCT coefficient from the multiplying section 40. Therefore, the selecting section 50 selectively delivers to the electronic watermark detecting section 30 the DCT coefficient from the multiplying section 40 with the second electronic watermark inserted therein.

Thus, the multiplying section 40 multiplies, by the quantization coefficient and the level, the data with the second electronic watermark inserted therein by the electronic watermark inserting section 20 to again produce the DCT coefficient. The DCT coefficient is supplied from the multiplying section 40 through the selecting section 50 to the electronic watermark detecting section 30. The electronic watermark detecting section 30 carries out judgment about detection for the second electronic watermark being inserted. Depending upon the judgment result, the detection intensity is informed to the electronic watermark inserting section 20. The electronic watermark inserting section 20 increases the insertion intensity to increase the detection intensity when the detection result shows a low intensity and decreases the insertion intensity to suppress the deterioration in picture quality when the detection result shows a high intensity.

Thus, in this embodiment, the detection intensity can be maintained or the deterioration in picture quality can be suppressed by adjusting the insertion intensity upon insertion of the electronic watermark into the coded data of the digital image according to, for example, the MPEG standard.

Figure 5:
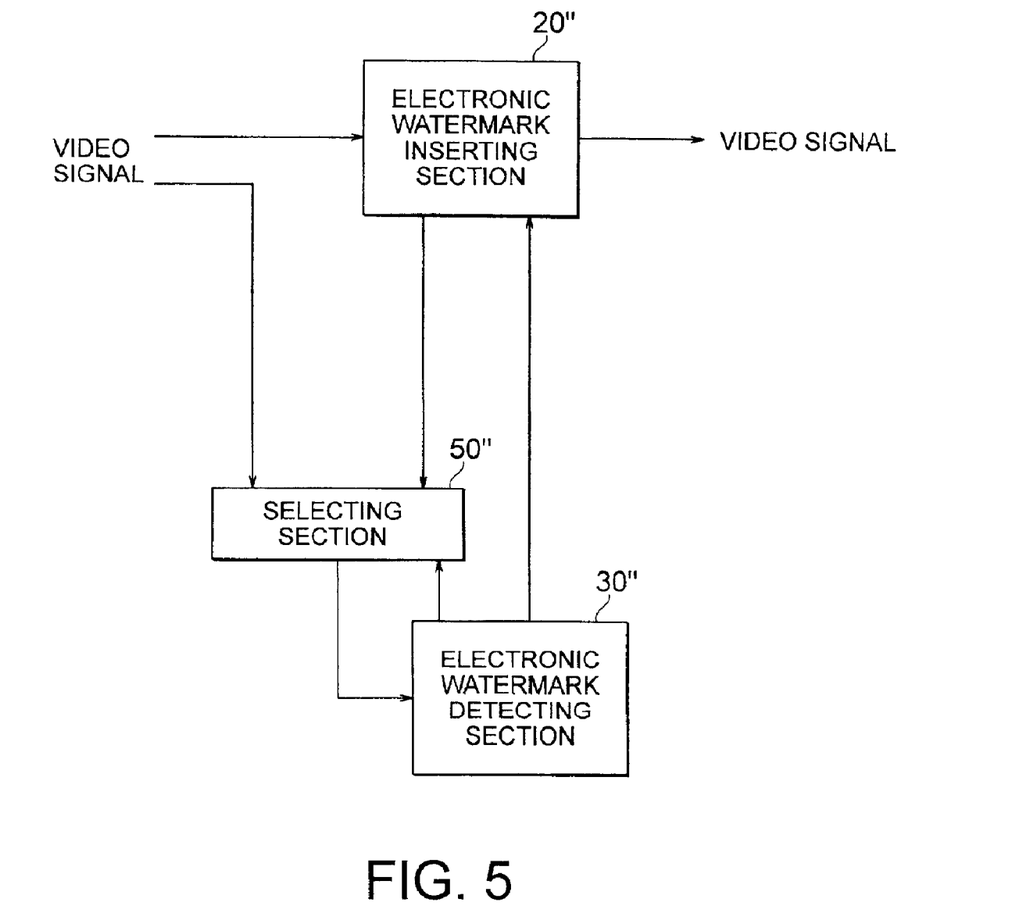
FIG. 5 is a block diagram of an electronic watermark detecting/inserting device according to another embodiment of this invention.

Referring to FIG. 5, an electronic watermark detecting/inserting device according to another embodiment of this invention is illustrated. The electronic watermark detecting/inserting device receives a video signal such as a NTSC (National Television System Committee) signal and a PAL (Phase Alternation by Line) signal as a video signal to be subjected to electronic watermark insertion.

In the electronic watermark detecting/inserting device, a selecting portion 50" at first selectively delivers the above-mentioned video signal to an electronic watermark detecting section 30". Supplied through the selecting section 50" with the video signal, the electronic watermark detecting section 30" carries out detecting operations for first and second electronic watermarks. If the first electronic watermark is detected but the second electronic watermark is not detected following thereto, the electronic watermark detecting section 30" delivers a request for insertion of the second electronic watermark to the electronic watermark inserting section 20" and delivers to a selecting section 50" a request to selectively output the data from the electronic watermark inserting section 20".

Supplied from the electronic watermark detecting section 30" with the request for insertion, the electronic watermark inserting section 20" inserts the second electronic watermark into the video signal and delivers to the outside and the selecting section 50" the video signal with the second electronic watermark inserted therein.

At this time, the selecting section 50" is supplied from the electronic watermark detecting section 30" with the request to selectively output the data from the electronic watermark inserting section 20". Therefore, the selecting section 50" selectively delivers to the electronic watermark detecting section 30" the data supplied from the electronic watermark inserting section 20" and containing the second electronic watermark inserted therein.

The electronic watermark detecting section 30" carries out the detecting operation for the second electronic watermark being inserted and judges the detection intensity. The electronic watermark detecting section 30" informs the electronic watermark inserting section 20" of the detection intensity of the second electronic watermark thus judged. The electronic watermark inserting section 20" decreases the insertion intensity if the detection intensity being informed is high and increases the insertion intensity if the detection intensity being informed is low. Thus, the insertion intensity of the second electronic watermark is automatically adjusted.

As described above, according to this invention, the electronic watermark detecting/inserting device capable of automatically adjusting the insertion intensity of the electronic watermark is obtained.

What is claimed is:

1. An electronic watermark detecting/inserting device for producing, in response to an input digital image which comprises a first electronic watermark inserted therein and which has a first DCT (Discrete Cosine Transform) coefficient, an output digital image which comprises said first electronic watermark inserted therein and a second electronic watermark inserted subsequently to said first electronic watermark in said output digital image and which has a second DCT coefficient, said device comprising:

a first DCT coefficient producing section (10) for producing said first DCT coefficient from said input digital image;

an electronic watermark detecting section (30) for detecting said first electronic watermark from said first DCT coefficient and for producing a request for insertion of said second electronic watermark;

an electronic watermark inserting section (20) for inserting, in response to said request for insertion of the second electronic watermark, said second electronic watermark into said input digital image subsequently to said first electronic watermark and for producing said output digital image which comprises said second electronic watermark inserted subsequently to said first electronic watermark in said output digital image and which has said second DCT coefficient;

a second DCT coefficient producing section (40) for producing said second DCT coefficient from said output digital image; and a DCT coefficient supplying section (50) for supplying said second DCT coefficient from said second DCT coefficient producing section to said electronic watermark detecting section;

said electronic watermark detecting section detecting, when supplied with said second DCT coefficient from said DCT coefficient supplying section, said second electronic watermark from said second DCT coefficient and producing a detection result representative of a detection intensity of said second electronic watermark to deliver said detection result to said electronic watermark inserting section;

said electronic watermark inserting section adjusting, in response to said detection intensity represented by said detection result, an insertion intensity of said second electronic watermark to be inserted into said input digital image.

2. An electronic watermark detecting/inserting device as claimed in claim 1, wherein:

said input digital image is a digital image according to a MPEG (Moving Picture Experts Group) standard.

3. An electronic watermark detecting/inserting device as claimed in claim 1, wherein:

said DCT coefficient supplying section is a selecting section connected not only to said second DCT coefficient producing section but also to said first DCT coefficient producing section for selectively supplying said first DCT coefficient from said fist DCT coefficient producing section to said electronic watermark detecting section initially and for selectively supplying said second DCT coefficient from said second DCT coefficient producing section to said electronic watermark detecting section when said electronic watermark detecting section detects said first electronic watermark from said first DCT coefficient.

4. An electronic watermark detecting/inserting device as claimed in claim 1, wherein:

said electronic watermark inserting section adjusts said insertion intensity of the second electronic watermark so that said insertion intensity of the second electronic watermark is reduced when the detection intensity represented by said detection result is high and that said insertion intensity of the second electronic watermark is increased when the detection intensity represented by said detection result is low.

5. An electronic watermark detecting/inserting device for producing, in response to an input video signal which comprises a first electronic watermark inserted therein, an output video signal which comprises said first electronic watermark inserted therein and a second electronic watermark inserted subsequently to said first electronic watermark in said output video signal, said device comprising:

an electronic watermark detecting section (30") for detecting said first electronic watermark from said input video signal and for producing a request for insertion of said second electronic watermark;

an electronic watermark inserting section (20") for inserting, in response to said request for insertion of the second electronic watermark, said second electronic watermark into said input video signal subsequently to said first electronic watermark and for producing said output video signal which comprises said second electronic watermark inserted subsequently to said first electronic watermark in said output video signal; and a supplying section (50") for supplying said output video signal to said electronic watermark detecting section;

said electronic watermark detecting section detecting, when supplied with said output video signal from said supplying section, said second electronic watermark from said output video signal and producing a detection result representative of a detection intensity of said second electronic watermark to deliver said detection result to said electronic watermark inserting section;

said electronic watermark inserting section adjusting, in responsive to said detection intensity represented by said detection result, an insertion intensity of said second electronic watermark to be inserted into said input video signal.

6. An electronic watermark detecting/inserting device as claimed in claim 5, wherein:

said input video signal is any one of a NTSC (National Television System Committee) signal and a PAL (Phase Alternation by Line) signal.

7. An electronic watermark detecting/inserting device as claimed in claim 5, wherein:

said supplying section is a selecting section for selectively supplying said input video signal to said electronic watermark detecting section initially and for selectively supplying said output video signal from said electronic watermark inserting section to said electronic watermark detecting section when said electronic watermark detecting section detects said first electronic watermark from said input video signal.

8. An electronic watermark detecting/inserting device as claimed in claim 5, wherein:

said electronic watermark inserting section adjusts said insertion intensity of the second electronic watermark so that said insertion intensity of the second electronic watermark is reduced when the detection intensity represented by said detection result is high and that said insertion intensity of the second electronic watermark is increased when the detection intensity represented by said detection result is low.

* * * * *